United States Patent
Saje et al.

(10) Patent No.: US 9,452,783 B1
(45) Date of Patent: Sep. 27, 2016

(54) OFFSET BULKHEAD FOR CREATING A COMPRESSIVE MECHANICAL LOCK

(71) Applicant: GM GLOBAL TECHNOLOGY OPERATIONS LLC, Detroit, MI (US)

(72) Inventors: Robert N. Saje, Shelby Township, MI (US); Michael E. Quigley, Washington Township, MI (US); John C. Johnson, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 6 days.

(21) Appl. No.: 14/676,907

(22) Filed: Apr. 2, 2015

(51) Int. Cl.
*B62D 21/15* (2006.01)
*B62D 25/08* (2006.01)
*B62D 25/14* (2006.01)
*B62D 25/20* (2006.01)

(52) U.S. Cl.
CPC ............ *B62D 21/152* (2013.01); *B62D 21/157* (2013.01); *B62D 25/08* (2013.01); *B62D 25/145* (2013.01); *B62D 25/2045* (2013.01)

(58) Field of Classification Search
CPC .... B62D 21/15; B62D 21/157; B62D 21/03; B62D 25/02; B62D 25/025; B62D 25/2036; B62D 25/2045; B62D 25/14; B62D 25/145; B62D 25/147; B62D 25/08; B62D 25/20; B62D 25/2018; B62D 27/02; B62D 27/023; B62D 27/04
USPC ............ 296/29, 30, 187.03, 187.09, 187.122, 296/187.12, 193.02, 193.05, 193.06, 296/193.09, 203.01, 203.02, 203.03, 204, 296/205, 70, 72; 180/90
See application file for complete search history.

(56) References Cited

U.S. PATENT DOCUMENTS

| | | | | |
|---|---|---|---|---|
| 6,322,124 B1* | 11/2001 | Kim | ..................... | B62D 25/081 296/187.09 |
| 7,121,615 B2* | 10/2006 | Hoshino | ................ | B62D 25/06 296/187.12 |
| 2003/0137163 A1* | 7/2003 | Hayashi | ............... | B62D 21/152 296/204 |
| 2004/0075265 A1* | 4/2004 | Cardimen | ............ | B62D 25/025 280/781 |
| 2004/0195865 A1* | 10/2004 | Tomita | ................... | B62D 21/09 296/203.04 |
| 2007/0096507 A1* | 5/2007 | Brunner | ............... | B62D 21/157 296/187.12 |
| 2010/0207426 A1* | 8/2010 | Tsuruta | ................ | B62D 21/157 296/187.12 |
| 2011/0031781 A1* | 2/2011 | Nishimura | ............. | B62D 25/04 296/187.12 |
| 2014/0021744 A1* | 1/2014 | Imamura | ............... | B62D 21/157 296/187.08 |
| 2015/0251703 A1* | 9/2015 | Yamada | ............... | B62D 25/087 296/187.12 |
| 2016/0052554 A1* | 2/2016 | Ozawa | ................. | B62D 21/152 296/187.09 |

* cited by examiner

*Primary Examiner* — Gregory Blankenship
(74) *Attorney, Agent, or Firm* — Quinn Law Group, PLLC

(57) ABSTRACT

A structure that creates a compressive mechanical lock during an external force includes a beam, an offset bulkhead, and a compressive member. The beam has a hollow cross section, an axis, and a wall. The bulkhead is disposed within the hollow cross section and attached to the wall. The member has an axis and an end attached to one of the bulkhead and the beam wall. The member axis and the beam axis intersect with each other in a plan view to form an obtuse angle. The bulkhead is offset from the intersection in an offset direction, parallel to the beam axis and toward the opening of the obtuse angle. The external force causes the member end to deform the beam wall so as to create a pocket or compressive mechanical lock in the beam wall that mechanically locks the member end from moving in the offset direction.

18 Claims, 3 Drawing Sheets

OFFSET BULKHEAD FOR CREATING A COMPRESSIVE MECHANICAL LOCK

TECHNICAL FIELD

This disclosure relates to an offset bulkhead for creating a compressive mechanical lock at the end of a member.

BACKGROUND

A vehicle may include a body structure having a beam and a compressive member with an end attached to the beam at an attachment. The vehicle may be subject to an external force. In some embodiments, the external force may load the compressive member in, for example compression, along its length. The compressive member and the beam may not be perpendicular to each other at the attachment and may thus form an acute angle and an obtuse angle at the attachment. The beam typically has an internal bulkhead at the attachment. The internal bulkhead is normally aligned with the end of the compressive member to prevent the compressive member from deforming the beam when the compressive member is loaded.

SUMMARY

A structure and a vehicle that create a compressive mechanical lock during an external force are provided herein. The structure includes a beam, an offset bulkhead, and a compressive member. The beam has a hollow beam cross section, a beam axis, and a beam wall. The bulkhead is disposed within the hollow beam cross section and is attached to the beam wall. The compressive member has a member axis and a member end attached to one of the bulkhead and the beam wall. The member axis and the beam axis intersect with each other in a plan view at an intersection to form an acute angle and an obtuse angle. The bulkhead is offset from the intersection in an offset direction, parallel to the beam axis and toward the opening of the obtuse angle, to misalign the bulkhead relative to the compressive member. The external force loads the compressive member along the member axis so that the member end deforms the beam wall so as to create a pocket in the beam wall that mechanically locks the member end from moving in the offset direction.

The vehicle creates a compressive mechanical lock during an external force and includes a body structure having a beam, an offset bulkhead, and a compressive member. The beam has a hollow beam cross section, a beam axis, and a beam wall. The bulkhead is disposed within the hollow beam cross section and is attached to the beam wall. The compressive member has a member cross section, a member axis, and a member end attached to one of the bulkhead and the beam wall. The member axis and the beam axis intersect with each other in a plan view at an intersection to form an acute angle and an obtuse angle. The bulkhead is offset from the intersection in an offset direction, parallel to the beam axis and toward the opening of the obtuse angle, to misalign the bulkhead relative to the compressive member. The external force loads the compressive member along the member axis so that the member end deforms the beam wall so as to create a pocket in the beam wall that mechanically locks the member end from moving in the offset direction.

This disclosure applies to any structure having a similar beam and compressive member construction and subject to an external force.

The above features and advantages and other features and advantages of the present teachings are readily apparent from the following detailed description of the best modes for carrying out the present teachings when taken in connection with the accompanying drawings.

DETAILED DESCRIPTION

Figure 1:
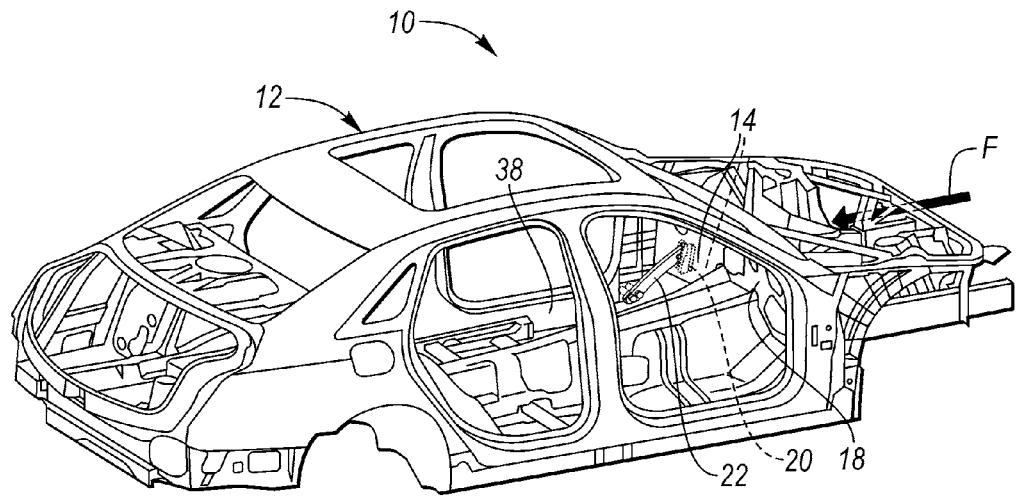
FIG. 1 is a schematic, perspective illustration of a vehicle that has a body structure including an offset bulkhead for creating a compressive mechanical lock during an external force.
Figure 2:
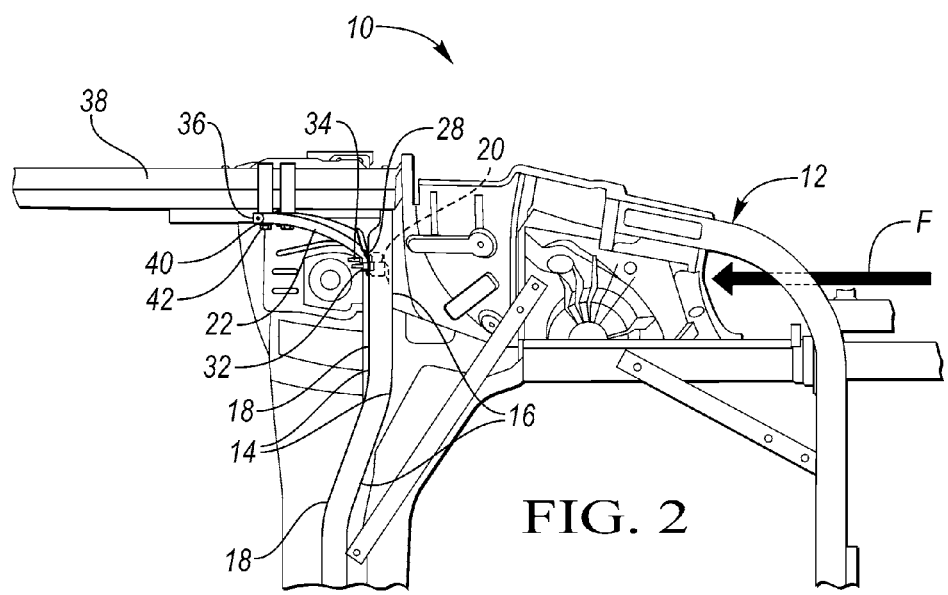
FIG. 2 is a fragmentary, schematic, plan view illustration of the driver's side, front portion of the vehicle of FIG. 1, showing the body structure including the offset bulkhead of FIG. 1 in greater detail.
Figure 3:
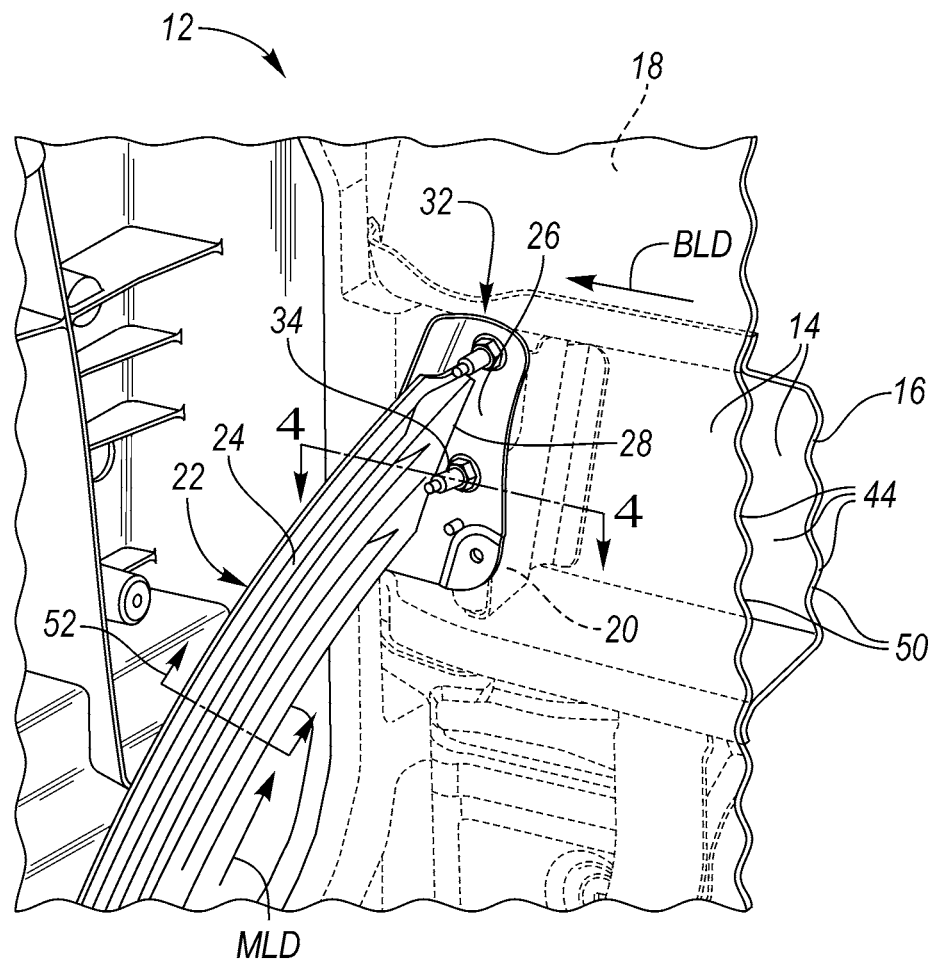
FIG. 3 is a fragmentary, schematic, perspective illustration of the vehicle of FIG. 1, showing the body structure including the offset bulkhead of FIG. 1 in greater detail.

Referring to the drawings, wherein like reference numbers refer to like components throughout the views, FIG. 1 shows a vehicle 10 that may be subject to an external force F. The vehicle 10 includes a body structure 12 that creates a pocket or compressive mechanical lock 66, as best seen in FIG. 4B, upon application of the external force F. Referring now to FIGS. 1 and 2, the body structure 12 includes a beam 14, an offset or misaligned bulkhead 20, and a compressive member 22. The body structure 12 may include a rocker rail 38. The body structure 12 may be made of a metal material and/or a non-metal material.

Referring generally to FIGS. 2-4A, the beam 14 may be formed by a panel 18 attached to a bar 16. The bar 16 may be configured to form a hollow beam cross section 44 when the bar 16 is attached to the panel 18, as shown. The panel 18 may be a dash panel, as shown and as understood by those skilled in the art. The bar 16 may be a number one bar, as shown and as understood by those skilled in the art. The panel 18 may be attached to the bar 16 via a weld, a mechanical fastener, an adhesive bond, and/or any other suitable attachment method. Alternatively, the beam 14 may be formed by the bar 16 and another bar (not shown) configured to form the hollow beam cross section 44 when attached to the bar 18. The beam 14 with the hollow beam cross section 44 may be formed in other ways as appropriate.

The beam 14 has a beam length direction BLD, the hollow beam cross section 44, a beam axis 48, and a beam wall 50. The beam length direction BLD is defined as the direction parallel to the longest dimension of the beam 14. The hollow beam cross section 44 is defined as the cross section of the beam 14 taken in a plane orthogonal the beam length direction BLD. The beam wall 50 may be formed by the panel 18 and/or the bar 16. The beam axis 48 is defined as a line that follows the beam centroid along the beam length direction BLD. The beam centroid is defined as the arithmetic mean position of all the points in the beam wall 50.

The offset or misaligned bulkhead 20 is disposed within the hollow beam cross section 44 and is attached to the beam wall 50. The bulkhead 20 may be made of a metal material and/or a non-metal material. The offset bulkhead 20 may be attached to the beam wall 50 via a weld, a mechanical fastener, an adhesive bond, and/or any other suitable attachment method. The offset bulkhead 20 may be attached to the beam wall 50 at a plurality of locations. The offset bulkhead 20 will be described in greater detail below The compressive member 22 has a member length direction MLD, a member cross section 52, a member axis 56, a member end 28, a member end width 30, and a member second end 36. The member length direction MLD is defined as the direction parallel to the longest dimension of the compressive member 22. The member cross section 52 is defined as the cross section of the compressive member 22 in a plane orthogonal the member length direction MLD. The member axis 56 is defined as a line that follows the member centroid along the member length direction MLD. The member centroid is defined as the arithmetic mean position of all the points in the member cross section 52.

The compressive member 22 may include an extrusion 24. The extrusion 24 may be made of an aluminum alloy material or any other suitable metal or non-metal material. The compressive member 22 may include a bracket 26 attached to the extrusion 24. The bracket 26 may be made of an aluminum alloy material or any other suitable metal or non-metal material. The bracket 26 may be attached to the extrusion 24 via a weld, a mechanical fastener, an adhesive bond, and/or any other suitable attachment method.

The member end 28 is attached to one of the bulkhead 20 and the beam 14 at an attachment 32. The attachment 32 may be via a mechanical fastener 34, a weld (not shown), an adhesive bond (not shown), and/or any other suitable fastening method. The mechanical fastener 34 may be a nut on a stud, as shown, a bolt and a nut, a screw, a rivet, and/or any other suitable mechanical fastener. The member second end 36 may be attached to the rocker rail 38 or to any other part of the structure 12 at a second attachment 40. The second attachment 40 may be via a second mechanical fastener 42, a weld (not shown), an adhesive bond (not shown), and/or any other suitable fastening method.

Figure 4A:
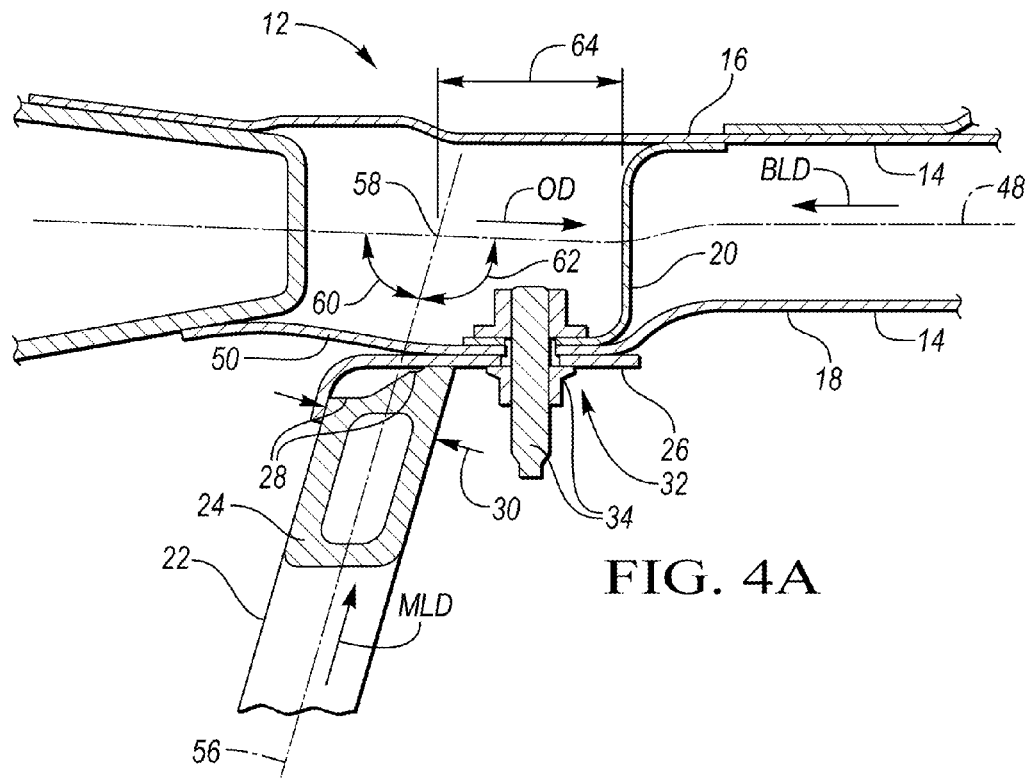
FIG. 4A is a schematic, cross-sectional illustration, partially in elevation, of the body structure including the offset bulkhead of FIG. 3, taken at line 4-4 of FIG. 3, before the external force.
Figure 4B:
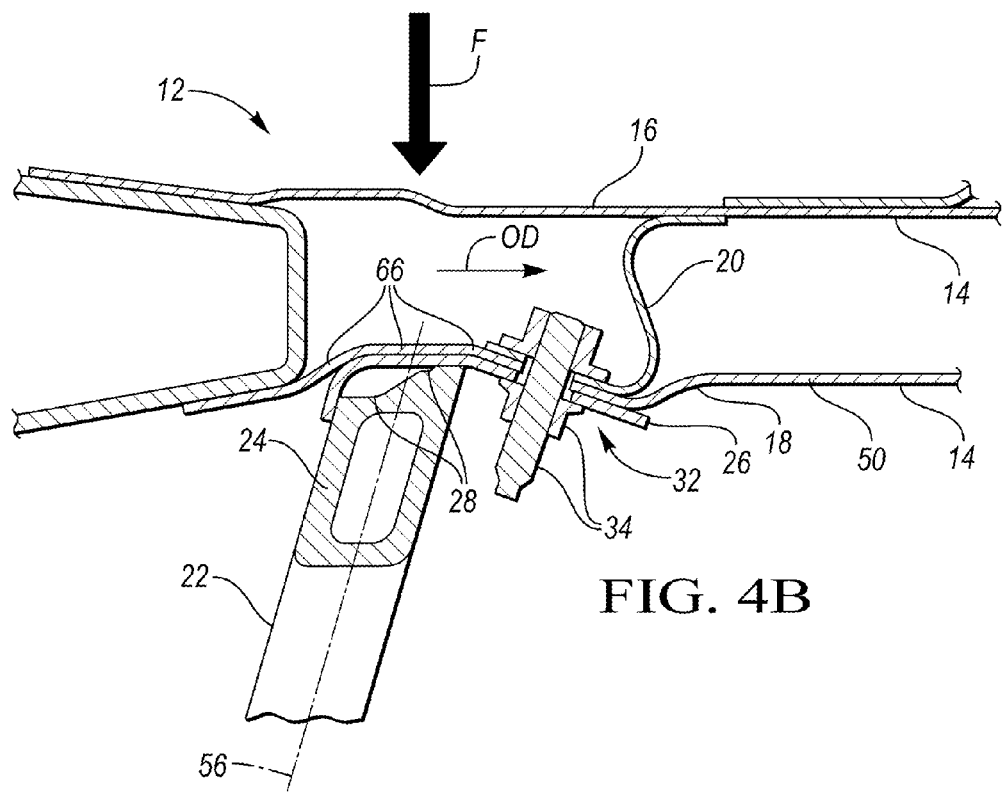
FIG. 4B is a schematic, cross-sectional illustration, partially in elevation, of the body structure including the offset bulkhead of FIG. 3, taken at line 4-4 of FIG. 3, upon application of the external force.

Referring now to FIG. 4A, the member axis 56 and the beam axis 48 intersect with each other in a plan view at an intersection 58 to form an acute angle 60 and an obtuse angle 62. The plan view may be from above the vehicle 10 in a direction orthogonal to a plane formed by the ground, as shown, or may be from any other direction in three dimensional space as appropriate, depending on the direction of the external force F and the configuration of the structure 12. The member axis 56 may be curved to form the acute angle 60 and the obtuse angle 62 at the intersection 58.

The bulkhead 20 is offset or misaligned from the intersection 58 in an offset direction OD, parallel to the beam axis 48 and toward the opening of the obtuse angle 62, by an offset distance 64. More specifically, the offset direction OD is parallel to the beam axis 48 and pointing away from the vertex of the obtuse angle 62 and along the arm of the obtuse angle 62 that is parallel to the beam axis 48, as shown. Thus, the bulkhead 20 is offset or misaligned relative to the compressive member 22 by the offset distance 64. The bulkhead 20 may be offset from the intersection 58 of the beam axis 48 and the member axis 56 in the offset direction OD by an offset distance 64 of at least the member end width 30.

Referring now to FIG. 4B, the external force F loads the compressive member 22 along the member axis 56 so that the member end 28 deforms the beam wall 50 so as to create the pocket or compressive mechanical lock 66 in the beam wall 50 that mechanically locks the member end 28 from moving in the offset direction OD. In some embodiments, the external force F may load the compressive member 22 substantially in compression; in others it may be a combination including, but not limited to, compression, bending, torsion and tension depending on the application and the particulars of the external force F. The pocket or compressive mechanical lock 66 may prevent the member end 28 from moving in the offset direction OD upon application of the external force F. The pocket or compressive mechanical lock 66 may prevent the member end 28 from moving in a direction parallel to the beam axis 48 in response to the external force F. The pocket or compressive mechanical lock 66 may prevent the member end 28 from moving in a direction perpendicular the external force F. The bulkhead 20 and the bracket 26 may deform in response to the external force F, as shown. The external force F may load the beam 14, for example, in bending and/or in compression perpendicular to the beam axis 48.

If the bulkhead 20 was not offset or misaligned, according to this disclosure, the bulkhead 20 may prevent deformation of the beam wall 50 and may prevent formation of the pocket or compressive mechanical lock 66. This disclosure applies to any structure 12 having a similar beam 14 and compressive member 22 construction and subject to a similar external force F.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A structure that creates a compressive mechanical lock, the structure comprising:
   a beam having a hollow beam cross section, a beam axis, and a beam wall;
   a bulkhead disposed within the hollow beam cross section and attached to the beam wall; and
   a compressive member having a member axis and a member end attached to one of the bulkhead and the beam wall;
   wherein the member axis and the beam axis intersect with each other in a plan view at an intersection to form an acute angle and an obtuse angle;
   wherein the bulkhead is offset from the intersection in an offset direction, parallel to the beam axis and toward the opening of the obtuse angle, to misalign the bulkhead relative to the compressive member; and
   wherein loading of the compressive member along the member axis causes the member end to deform the beam wall so as to create a pocket in the beam wall that mechanically locks the member end from moving in the offset direction.

2. The structure of claim 1, wherein the compressive member is loaded substantially in compression along the member axis; and
   wherein the compressive member axis is curved to form the acute angle and the obtuse angle at the intersection.

3. The structure of claim 1, wherein the external force loads the beam perpendicular to the beam axis.

4. The structure of claim 1, wherein the compressive member is attached to one of the bulkhead and the beam via a mechanical fastener.

5. The structure of claim 1, wherein the compressive member is attached to one of the bulkhead and the beam via a weld.

6. The structure of claim 1, wherein the compressive member has a member end width; and
   wherein the bulkhead is offset from the intersection of the beam axis and the member axis by at least the member end width.

7. A vehicle that creates a compressive mechanical lock during an external force, the vehicle comprising:
   a body structure including:
      a beam having a hollow beam cross section, a beam axis, and a beam wall;
      a bulkhead disposed within the hollow beam cross section and attached to the beam wall; and
      a compressive member having a member cross section, a member axis, and a member end attached to one of the bulkhead and the beam wall;
   wherein the member axis and the beam axis intersect with each other in a plan view at an intersection to form an acute angle and an obtuse angle;
   wherein the bulkhead is offset from the intersection in an offset direction, parallel to the beam axis and toward the opening of the obtuse angle, to misalign the bulkhead relative to the compressive member; and
   wherein the external force loads the compressive member along the member axis so that the member end deforms the beam wall so as to create a pocket in the beam wall that mechanically locks the member end from moving in the offset direction.

8. The vehicle of claim 7, wherein the external force loads the compressive member substantially in compression along the member axis; and
   wherein the compressive member axis is curved to form the acute angle and the obtuse angle at the intersection.

9. The vehicle of claim 7, wherein the external force loads the beam perpendicular to the beam axis.

10. The vehicle of claim 7, wherein the compressive member is attached to one of the bulkhead and the beam via a mechanical fastener.

11. The vehicle of claim 7, wherein the compressive member is attached to one of the bulkhead and the beam via a weld.

12. The vehicle of claim 7, wherein the compressive member has a member end width; and
   wherein the bulkhead is offset from the intersection of the beam axis and the member axis by at least the member end width.

13. The vehicle of claim 7, wherein the beam is formed by a number one bar attached to a dash panel.

14. The vehicle of claim 13, wherein the body structure includes a rocker rail and the compressive member has a second end; and
   wherein the member second end is attached to the rocker rail.

15. The vehicle of claim 14, wherein the compressive member end is attached to one of the bulkhead and the dash panel via a mechanical fastener; and
   wherein the compressive member second end is attached to the rocker rail via a mechanical fastener.

16. The vehicle of claim 15, wherein the beam is made of a metal material.

17. The vehicle of claim 16, wherein the compressive member is made of a metal material.

18. The vehicle of claim 17, wherein the compressive member includes an extrusion made of an aluminum alloy material.

* * * * *